United States Patent
Zhong et al.

(10) Patent No.: US 11,849,263 B2
(45) Date of Patent: Dec. 19, 2023

(54) PROJECTION FOCUSING METHOD, PROJECTION FOCUSING APPARATUS, PROJECTOR, AND READABLE STORAGE MEDIUM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Zhong Ning, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/598,318

(22) PCT Filed: Mar. 13, 2020

(86) PCT No.: PCT/CN2020/079216
§ 371 (c)(1),
(2) Date: Sep. 27, 2021

(87) PCT Pub. No.: WO2021/128601
PCT Pub. Date: Jul. 1, 2021

(65) Prior Publication Data
US 2022/0321848 A1    Oct. 6, 2022

(30) Foreign Application Priority Data

Dec. 26, 2019    (CN) .......................... 201911370175.0

(51) Int. Cl.
*H04N 9/31* (2006.01)
(52) U.S. Cl.
CPC ................................. *H04N 9/317* (2013.01)

(58) Field of Classification Search
CPC .... G03B 21/53; G03B 21/142; G03B 21/147; G03B 21/208; H04N 9/312; H04N 9/317;
(Continued)

(56) References Cited

U.S. PATENT DOCUMENTS

| 2006/0139582 A1* | 6/2006 | Saito | G03B 21/142 |
| | | | 353/101 |
| 2006/0152682 A1* | 7/2006 | Matsuda | H04N 9/3185 |
| | | | 353/40 |

(Continued)

FOREIGN PATENT DOCUMENTS

| CN | 104570569 B | 4/2015 |
| CN | 105842972 A | 8/2016 |

(Continued)

OTHER PUBLICATIONS

The European search report of patent family EP application No. 20906561.4 dated Nov. 14, 2022.

*Primary Examiner* — Sultan Chowdhury
(74) *Attorney, Agent, or Firm* — Gang Yu (57) ABSTRACT

The disclosure relates to the technical field of projection auto-focusing, and embodiments particularly disclose a projection focusing method, a projection focusing apparatus, a projector, and a readable storage medium. According to the projection focusing method provided by this application, an initial position of a focused motor is roughly determined based on a current projection distance, a focusing direction is determined according to the current projection distance and a projection distance corresponding to the current motor position, a position of a clearest projection picture can be found by traversing a few motor positions, and the speed and precision of projection focusing are greatly increased.

16 Claims, 5 Drawing Sheets

(58) Field of Classification Search
CPC .. H04N 9/3135; H04N 9/3185; H04N 9/3188; H04N 9/3194; H04N 9/3197; H04N 23/67; H04N 23/667; H04N 23/681
See application file for complete search history.

(56) References Cited

U.S. PATENT DOCUMENTS

| | | | |
|---|---|---|---|
| 2014/0132938 A1* | 5/2014 | Tsuchiya | G02B 7/32 |
| | | | 353/101 |
| 2015/0015854 A1* | 1/2015 | Na | H04N 9/3194 |
| | | | 353/101 |
| 2015/0237318 A1 | 8/2015 | Nakashin | |
| 2018/0120687 A1 | 5/2018 | Jiang | |
| 2018/0284588 A1* | 10/2018 | Wu | G03B 21/53 |

FOREIGN PATENT DOCUMENTS

| | | |
|---|---|---|
| CN | 106154721 A | 11/2016 |
| CN | 106896466 A | 6/2017 |
| CN | 107318007 A | 11/2017 |
| CN | 108710251 A | 10/2018 |
| CN | 109856902 A | 6/2019 |
| CN | 106896466 B | 7/2019 |
| CN | 109963067 A | 7/2019 |
| TW | 201541957 A | 11/2015 |
| TW | 201721267 A | 6/2017 |
| WO | 2017185562 A1 | 11/2017 |

* cited by examiner

PROJECTION FOCUSING METHOD, PROJECTION FOCUSING APPARATUS, PROJECTOR, AND READABLE STORAGE MEDIUM

TECHNICAL FIELD

The disclosure relates to the technical field of projection auto-focusing, and in particular, to a projection focusing method, a projection focusing apparatus, a projector, and a readable storage medium.

BACKGROUND

An existing projection focusing method includes a camera-based focusing solution and a ranging-based focusing solution, the camera-based focusing solution is based on a projection contrast focusing technology, focusing is mainly carried out by utilizing a difference value between different pixels of an image, wherein a clearest position of a projection is a maximum value of a pixel difference value, this method, however, needs to sequentially traverse a plurality of positions from a certain initial position each time, time consumption is high, and the focusing solution is low in speed, while the ranging-based focusing solution is not stable and accurate enough.

SUMMARY

In view of this, this application provides a projection focusing method, a projection focusing apparatus, a projector, and a readable storage medium which may solve, or at least partially solve, the above problems.

In order to solve the technical problems, a technical solution provided by the disclosure is a projection focusing method, which includes the following steps.

A current motor position is acquired, and a first projection distance value corresponding to the current motor position is acquired according to a preset projection distance and motor position mapping relation.

A current projection distance as a second projection distance value is acquired, and a target motor position corresponding to the second projection distance value is acquired according to a preset projection distance and motor position mapping relation.

A focusing direction is determined according to the first projection distance value and the second projection distance value, and the target motor position is converted into a target motor position range according to a preset motor position error.

The motor is driven to move from a starting point of the target motor position range to an end point of the target motor position range according to the focusing direction, a definition value of a current projection picture is calculated each step that the motor is driven to move, and focusing is completed when the motor is driven to move to a motor position with a highest definition value of a projection picture.

Preferably, the method for determining the focusing direction according to the first projection distance value and the second projection distance value includes the following steps.

Whether the first projection distance value is greater than the second projection distance value is judged.

When the first projection distance value is greater than the second projection distance value, the focusing direction is set as a first direction, that is, the motor moving towards the first direction corresponds to the projection distance becoming shorter.

When the first projection distance value is not greater than the second projection distance value, the focusing direction is set as a second direction, that is, the motor moving towards the second direction corresponds to the projection distance becoming longer.

Preferably, the method for converting the target motor position into a target motor position range according to a preset motor position error includes the following steps.

According to the preset motor position error, a difference value between the target motor position and the motor position error is taken as the starting point of the target motor position range, and a sum value of the target motor position and the motor position error is taken as the end point of the target motor position range.

Preferably, the method for driving the motor to move from a starting point of the target motor position range to an end point of the target motor position range according to the focusing direction, calculating a definition value of a current projection picture each step that the motor is driven to move, and completing focusing when the motor is driven to move to a motor position with a highest definition value of a projection picture includes the following steps.

The motor is driven to reach the starting point of the target motor position range according to the focusing direction.

The motor is driven to move to the end point of the target motor position range, a current projection picture image is acquired each step that the motor is driven to move, a definition value of the current projection picture image is calculated, the definition value of the current projection picture image is compared with a definition value of a previous projection picture image, and when the definition value of the current projection picture image is less than the definition value of the previous projection picture image, the motor is driven to return to the previous step to complete focusing.

The disclosure also provides a projection focusing apparatus, including a projection distance acquiring component, a target position acquiring component, a focusing range acquiring component and a driving focusing calculating component.

The projection distance acquiring component which is configured to acquire a current motor position, and acquire a first projection distance value corresponding to the current motor position according to a preset projection distance and motor position mapping relation.

The target position acquiring component which is configured to acquire a current projection distance as a second projection distance value, and acquire a target motor position corresponding to the second projection distance value according to a preset projection distance and motor position mapping relation.

The focusing range acquiring component which is configured to determine a focusing direction according to the first projection distance value and the second projection distance value, and convert the target motor position into a target motor position range according to a preset motor position error.

The driving focusing calculating component which is configured to drive the motor to move from a starting point of the target motor position range to an end point of the target motor position range according to the focusing direction, calculate a definition value of a current projection picture each step that the motor is driven to move, and complete focusing when the motor is driven to move to a motor position with a highest definition value of a projection picture.

Preferably, the focusing range acquiring component which includes a focusing direction judging unit, a first setting unit and a second setting unit.

The focusing direction judging unit which is configured to judge whether the first projection distance value is greater than the second projection distance value, if yes, entering the first setting unit, and if no, entering the second setting unit.

The first setting unit which is configured to set the focusing direction as a first direction, that is, the motor moving towards the first direction corresponds to the projection distance becoming shorter.

The second setting unit which is configured to set the focusing direction as a second direction, that is, the motor moving towards the second direction corresponds to the projection distance becoming shorter.

Preferably, the focusing range acquiring component includes a focusing range generating unit.

The focusing range generating unit which is configured to taking a difference value between the target motor position and the motor position error as a starting point of the target motor position range, and taking a sum value of the target motor position and the motor position error as an end point of the target motor position range, according to the preset motor position error.

Preferably, the driving focusing calculating component includes a motor driving unit and a definition comparing unit.

The motor driving unit is used for driving a motor to reach a starting point of a target motor position range according to a focusing direction.

The definition comparing unit which is configured to drive the motor to move to an end point of the target motor position range, acquire a current projection picture image each step that the motor is driven to move, calculate a definition value of the current projection picture image, compare the definition value of the current projection picture image with a definition value of a previous projection picture image, and when the definition value of the current projection picture image is less than the definition value of the previous projection picture image, drive the motor to return to the previous step to complete focusing.

The disclosure also provides a projector, including a memory and a processor.

The memory which is configured to store a computer program.

The processor which is configured to execute the computer program to implement the steps of the projection focusing method as described above.

The disclosure also provides a readable storage medium, which stores a computer program that, when executed by a processor, implements the steps of the projection focusing method as described above.

Compared with the related art, this application has the beneficial effects described in detail as follows. According to the projection focusing method provided by the application, an initial position of a focused motor is roughly determined based on a current projection distance, a focusing direction is determined according to the current projection distance and a projection distance corresponding to the current motor position, a position of a clearest projection picture can be found by traversing a few motor positions, and the speed and precision of projection focusing are greatly increased.

BRIEF DESCRIPTION OF THE DRAWINGS

In order to describe the embodiments of the disclosure clearly, the drawings required to be used in the embodiments will be simply introduced below. It is apparent that the drawings in the following descriptions are only some embodiments of the disclosure. Those of ordinary skill in the art may further obtain other drawings according to these drawings without creative work.

DETAILED DESCRIPTION OF THE EMBODIMENTS

The technical solutions in the embodiments of this application will be clearly and completely described below in combination with the drawings in the embodiments of this application. It is apparent that the described embodiments are not all embodiments but part of embodiments of this application. All other embodiments obtained by those of ordinary skill in the art on the basis of the embodiments in this application without creative work shall fall within the scope of protection of this application.

In order that those skilled in the art better understand the technical solutions of the disclosure, the disclosure will be described in further detail with reference to the accompanying drawings and specific examples.

Figure 1:
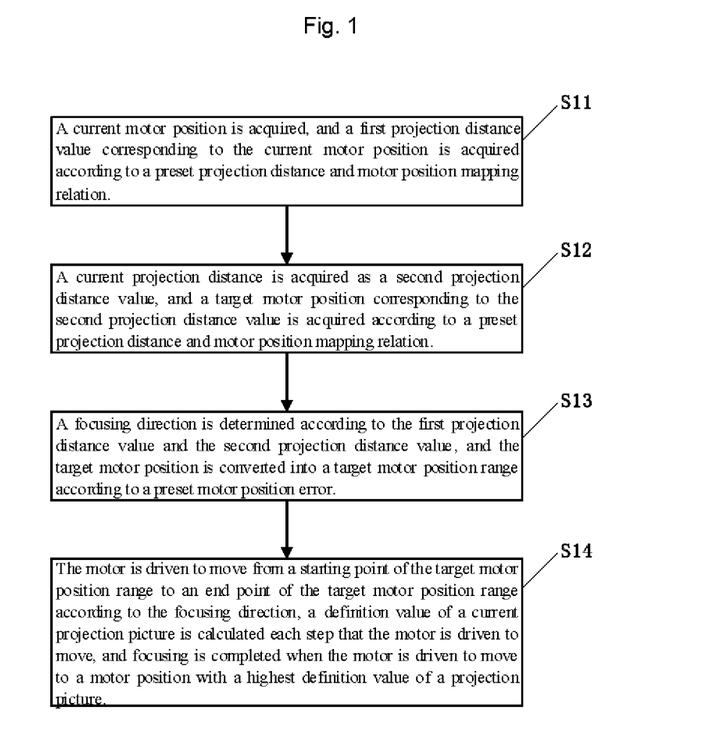
FIG. 1 is a schematic flowchart of a projection focusing method according to an embodiment of the disclosure.

As shown in FIG. 1, an embodiment of the disclosure provides a projection focusing method, which includes the following steps.

At S11, a current motor position is acquired, and a first projection distance value corresponding to the current motor position is acquired according to a preset projection distance and motor position mapping relation.

At S12, a current projection distance as a second projection distance value is acquired, and a target motor position corresponding to the second projection distance value is acquired according to a preset projection distance and motor position mapping relation.

At S13, a focusing direction is determined according to the first projection distance value and the second projection distance value, and the target motor position is converted into a target motor position range according to a preset motor position error.

At S14, the motor is driven to move from a starting point of the target motor position range to an end point of the target motor position range according to the focusing direction, a definition value of a current projection picture is calculated each step that the motor is driven to move, and focusing is completed when the motor is driven to move to a motor position with a highest definition value of a projection picture.

It is to be noted that a projection focusing method/apparatus provided by this application can be applied to an electronic device having a projection function, such as a projector, a projection machine and a projection television, and the electronic device includes a projection function component (an optical engine, etc.), a shooting function component (a camera, etc.) and a ranging function component (a ranging sensor, etc.), wherein the projection function component which is configured to project an image onto a projection surface, the shooting function component which is configured to shoot a projection picture on the projection surface to obtain a projection surface image, and the ranging function component which is configured to measure a distance from the projection function component to the projection surface. The three function components can be integrally assembled or separately assembled, and can all employ the projection focusing method/apparatus provided by this application.

Specifically, a pretreatment step is also included before S11, that is, S10, including the following operations. A mapping relation between a projection distance and a focal length is established, that is, a mapping relation between the projection distance and a motor position is established. An establishing method includes the following steps. A focusing curve model is determined according to focusing structures such as motor parameters and focusing reduction ratios, a corresponding relation is M=Log (a) x+b, wherein a is a value determined by the focusing structure parameters, x represents a projection distance, b represents a difference between different machines, and M represents a motor position.

It is to be noted that a method for acquiring a current motor position in S11 allows the current motor position in a device to be read, the current motor position is a motor position after last focusing, and according to a preset projection distance and motor position mapping relation, a projection distance at the last focusing can be calculated, that is a first projection distance value corresponding to the current motor position is acquired.

Specifically, there are two modes of focusing, one is manual while one is automatic, it is necessary to change the focal length by changing the motor position, and by recording the motor position, it is possible to determine whether a projection distance becomes longer or shorter according to a number of moving steps of the motor in previous moving and next moving.

It is to be noted that the method of acquiring a current projection distance in S12, that is measuring a distance between the device and a projection surface by means of the ranging component to obtain a second projection distance value. According to the preset projection distance and motor position mapping relation, mapping to the motor position can be carried out, that is, calculate a target motor position corresponding to the second distance value is calculated, that is, at that projection distance, the motor can be adjusted to the target motor position to achieve focusing.

Figure 2:
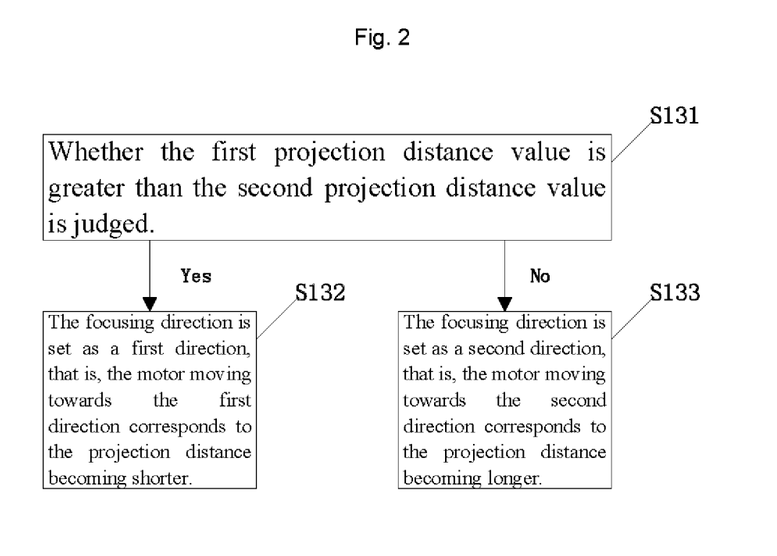
FIG. 2 is a schematic flowchart of a method for determining a focusing direction according to an embodiment of the disclosure.

As shown in FIG. 2, it is to be noted that the method for determining the focusing direction according to the first projection distance value and the second projection distance value at S13 includes the following steps.

At S131, whether the first projection distance value is greater than the second projection distance value is judged.

At S132, when the first projection distance value is greater than the second projection distance value, the focusing direction is set as a first direction, that is, the motor moving towards the first direction corresponds to the projection distance becoming shorter.

At S133, when the first projection distance value is not greater than the second projection distance value, the focusing direction is set as a second direction, that is, the motor moving towards the second direction corresponds to the projection distance becoming longer.

It is to be noted that the method for converting the target motor position into the target motor position range according to the preset motor position error at S13 includes the following steps.

According to the preset motor position error, a difference value between the target motor position and the motor position error is taken as the starting point of the target motor position range, and a sum value of the target motor position and the motor position error is taken as the end point of the target motor position range.

Figure 3:
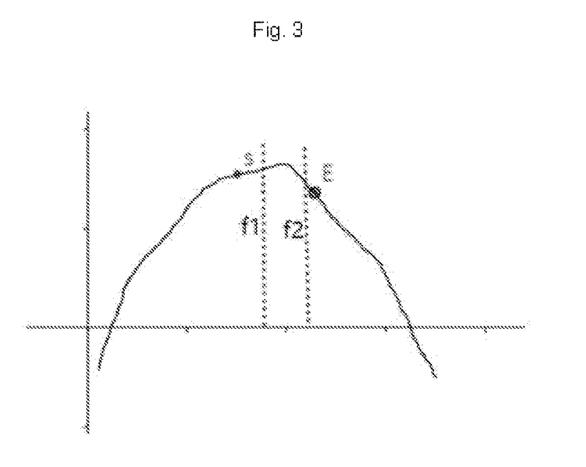
FIG. 3 is a diagram of the projection distance value corresponding to a definition value according to an embodiment of the disclosure.

Specifically, as shown in FIG. 3, it is necessary to record a motor position in real time, map the motor position into a projection distance value, and uniformly determine a focusing direction by using changes of the projection distance value in consideration that auto-focusing and manual focusing are alternated, so that it is extremely critical to determine a starting position of the motor. Both a measured distance value and a distance value to which the motor position is mapped have certain errors. As shown, FIG. 3 is a diagram of the projection distance value (motor position) corresponding to a definition value. A range of distance measurement errors fluctuates between f1 and f2, a fluctuation range is an empirical value F, and a clearest position needs to be found in f1 and f2 in order to focus successfully. In coarse positioning, the starting position of the motor is moved to a point s or e according to a measured first projection distance value and a second projection distance value corresponding to the motor position, and then a clearest point is found in the intervals of s, f1 and f2, ore, f2 and f1.

Herein, the preset motor position error is obtained by obtaining a deviation range corresponding to the motor position according to a ranging error range existing in a ranging sensor, wherein a motor deviation range corresponding to a maximum error range of theoretical ranging is taken.

Specifically, a second projection distance value of the projection function component from the projection surface is measured through the ranging sensor, the second projection distance value is not enough in precision due to device cost and principle limitations, after the second projection distance value is obtained, the second projection distance value is converted into a corresponding motor position X, the motor is driven to reach an X−d position according to a focusing direction, d represents a motor position error, and a focusing range is (X−d, X+d).

Figure 4:
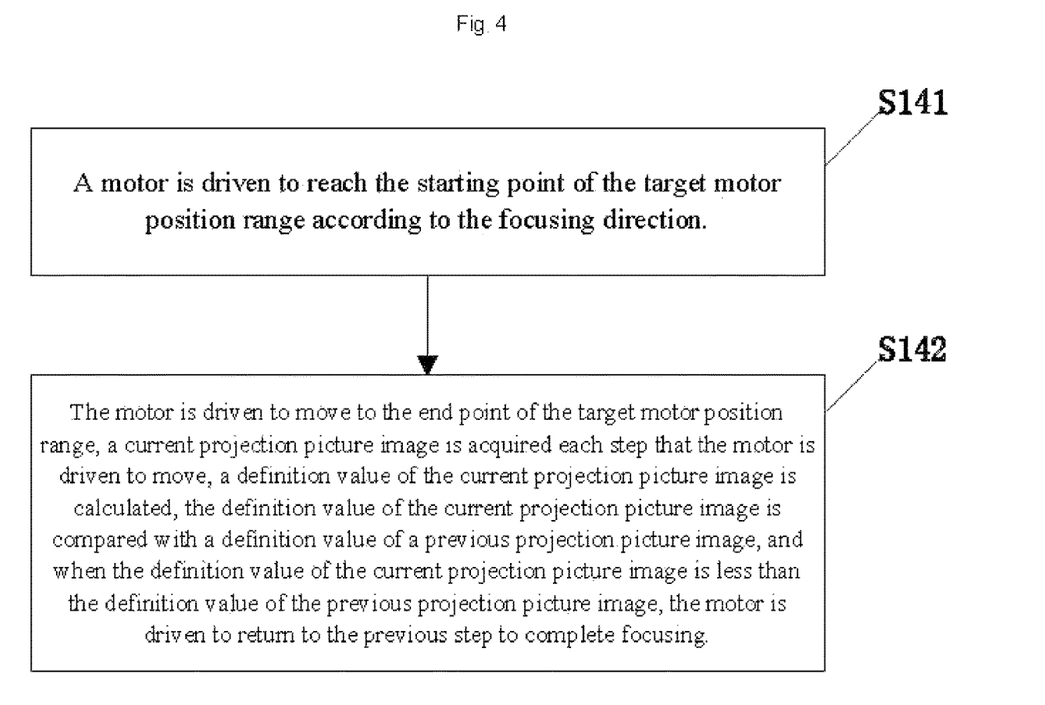
FIG. 4 is a schematic flowchart of a method for driving a motor to move for focusing according to an embodiment of the disclosure.

As shown in FIG. 4, it is to be noted that the method of S14 includes the following steps.

At S141, a motor is driven to reach the starting point of the target motor position range according to the focusing direction.

At S142, the motor is driven to move to the end point of the target motor position range, a current projection picture image is acquired each step that the motor is driven to move, a definition value of the current projection picture image is calculated, the definition value of the current projection picture image is compared with a definition value of a previous projection picture image, and when the definition value of the current projection picture image is less than the definition value of the previous projection picture image, the motor is driven to return to the previous step to complete focusing.

Specifically, before focusing is triggered, a second projection distance value is obtained, a focusing starting position (motor position) is determined according to the second projection distance value, a focusing direction of a motor can be known after a motor distance being longer or shorter is determined, the motor is driven to reach an X−d position, d represents a motor position error, the motor starts to rotate with X−d taken as a starting point, and the motor is driven to move to N positions, N is calculated according to a preset motor position error, and N=2*d, that is, when the motor moves within N positions again, one of the positions must be the clearest. Therefore, a camera is started at the same time, projection pictures are shot with each step moved, definition of one projection picture is analyzed when this picture is shot, calculation is carried out by using a variance method, and the clarity of one and next pictures is carried out until the definition of the current picture is less than that of the previous motor position, it indicates that a most confocal position is found, the motor is driven to return to the confocal position, and a focusing process is complete.

As shown in FIG. 4, an embodiment of the disclosure also provides a projection focusing apparatus, which is characterized by including a projection distance acquiring component 21, a target position acquiring component 22, a focusing range acquiring component 23 and a driving focusing calculating component 24.

The projection distance acquiring component 21 which is configured to acquire a current motor position, and acquire a first projection distance value corresponding to the current motor position according to a preset projection distance and motor position mapping relation.

The target position acquiring component 22 which is configured to acquire a current projection distance as a second projection distance value, and acquire a target motor position corresponding to the second projection distance value according to a preset projection distance and motor position mapping relation.

The focusing range acquiring component 23 which is configured to determine a focusing direction according to the first projection distance value and the second projection distance value, and convert the target motor position into a target motor position range according to a preset motor position error.

The driving focusing calculating component 24 is configured to drive the motor to move from a starting point of the target motor position range to an end point of the target motor position range according to the focusing direction, calculate a definition value of a current projection picture each step that the motor is driven to move, and complete focusing when the motor is driven to move to a motor position with a highest definition value of a projection picture.

It is to be noted that the focusing range acquiring component 23 includes a focusing direction judging unit, a first setting unit and a second setting unit.

The focusing direction judging unit which is configured to judge whether the first projection distance value is greater than the second projection distance value, entering the first setting unit when the first projection distance value is greater than the second projection distance value, and entering the second setting unit when the first projection distance value is not greater than the second projection distance value.

The first setting unit which is configured to set the focusing direction as a first direction, that is, the motor moving towards the first direction corresponds to the projection distance becoming shorter.

The second setting unit which is configured to set the focusing direction as a second direction, that is, the motor moving towards the second direction corresponds to the projection distance becoming shorter.

It is to be noted that the focusing range acquiring component 23 includes a focusing range generating unit.

The focusing range generating unit which is configured to take a difference value between the target motor position and the motor position error as a starting point of the target motor position range, and take a sum value of the target motor position and the motor position error as an end point of the target motor position range according to a preset motor position error.

It is to be noted that the driving focusing calculating component 24 includes a motor driving unit and a definition comparing unit.

The motor driving unit which is configured to drive a motor to reach the starting point of the target motor position range according to a focusing direction.

The definition comparing unit which is configured to drive the motor to move to an end point of the target motor position range, acquire a current projection picture image each step that the motor is driven to move, calculate a definition value of the current projection picture image, compare the definition value of the current projection picture image with a definition value of a previous projection picture image, and when the definition value of the current projection picture image is less than the definition value of the previous projection picture image, drive the motor to return to the previous step to complete focusing.

An embodiment of the disclosure also provides a projector, which includes a memory and a processor, the memory is configured to store a computer program, and the processor is configured to execute the computer program to implement the steps of the projection focusing method as described above.

The disclosure also provides a readable storage medium, which stores a computer program that, when executed by a processor, implements the steps of the projection focusing method as described above.

Figure 5:
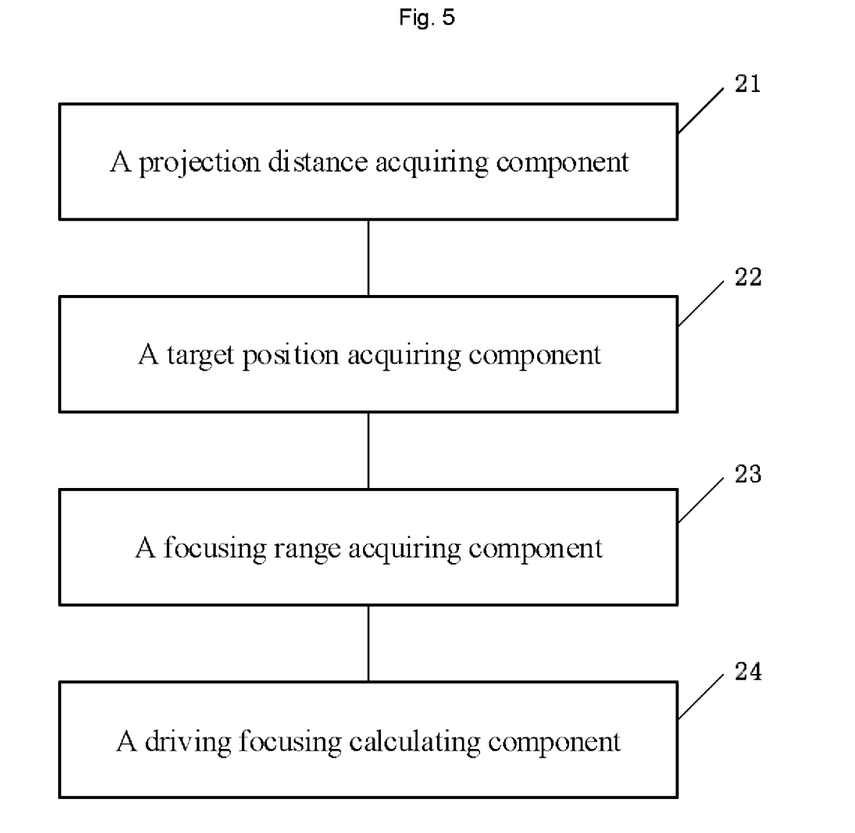
FIG. 5 is a schematic structural diagram of a projection focusing apparatus according to an embodiment of the disclosure.
Figure 6:
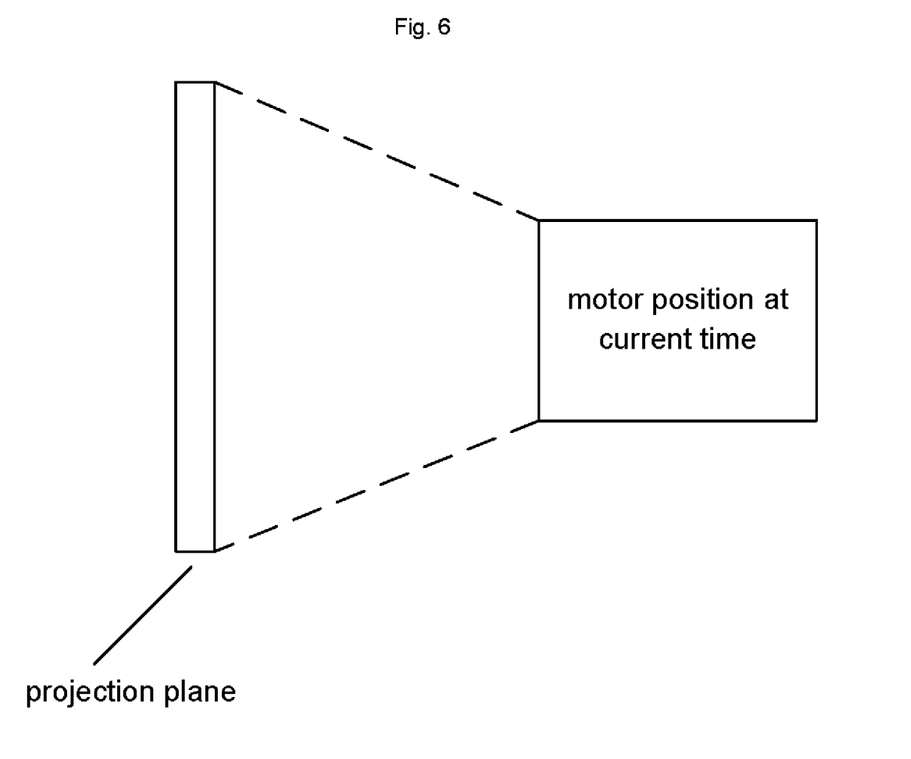
FIG. 6 is a structural diagram of a projection focusing method according to an embodiment of the disclosure.
Figure 7:
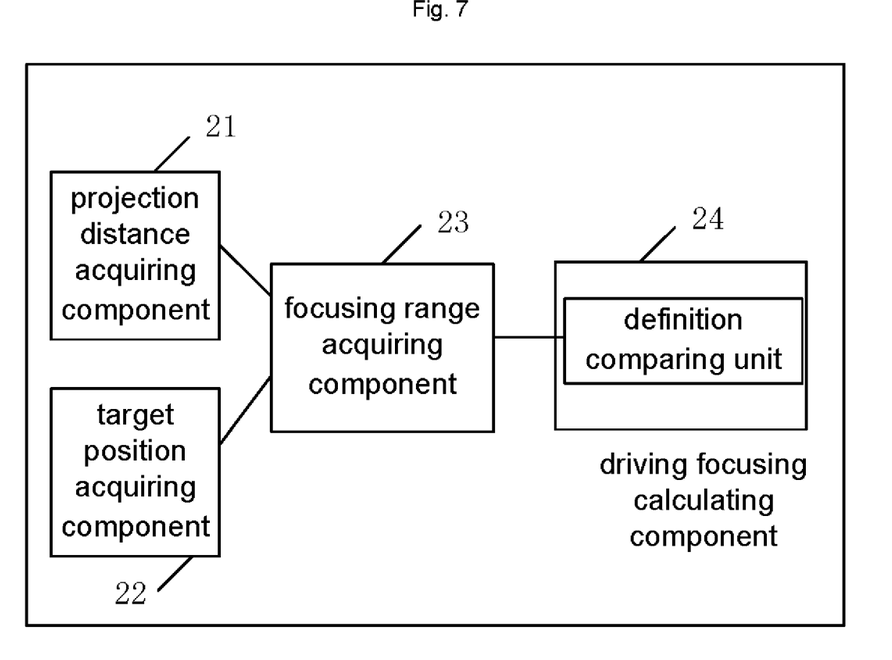
FIG. 7 is a schematic structural diagram of a projection focusing apparatus according to an embodiment of the disclosure.

The description of the features in the embodiment corresponding to FIG. 5 can be found in connection with the description of the embodiments corresponding to FIG. 1-4 and will not be elaborated here.

The projection focusing method, the projection focusing apparatus, the projector and the readable storage medium provided by the embodiments of the disclosure are described above in detail. In the specification, the various embodiments in this specification are described in a progressive manner, each embodiment is described with emphasis upon the differences from other embodiments, and the same or similar parts between the various embodiments can be referred to each other. For the apparatus disclosed in the embodiments, since the apparatus corresponds to the method disclosed in the embodiments, the description is relatively brief, and the relevant part can be explained with reference to the description of the method part. It should be pointed out that for those of ordinary skill in the art, without departing from the principle of the disclosure, various improvements and modifications may be made to the disclosure, and these improvements and modifications shall also fall within the protection scope of the claims of the disclosure.

Those skilled in the art may further realize that the units and steps of each method of each example described in combination with the embodiments disclosed in the disclosure may be implemented by electronic hardware, computer software or a combination of both. For clearly describing interchangeability of hardware and software, the composition points and steps of each example have been generally described according to functions in the above descriptions. Whether these functions are executed in a hardware or software manner depends on specific applications and design constraints of the technical solutions. Those skilled in the art may realize the described functions for each specific application by virtue of different methods, but such realization shall fall within the scope of this application.

The steps of a method or algorithm described in the embodiments of the disclosure may be implemented directly by hardware, a software component executed by the processor, or a combination of the two. The software component may reside in a Random Access Memory (RAM), a memory, a Read-Only Memory (ROM), an electrically programmable ROM, an electrically erasable programmable ROM, a register, a hard disk, a removable disk, a CD-ROM, or a storage medium in any other forms known in the art.

What is claimed is:

1. A projection focusing method, comprising:
    establishing a mapping relation between a projection distance and a motor position;
    acquiring a motor position at current time, and acquiring a first projection distance value corresponding to the motor position at current time according to the mapping relation;
    acquiring a current projection distance, and determining the current projection distance as a second projection distance value, and acquiring a target motor position corresponding to the second projection distance value according to the mapping relation;
    obtaining a comparison result by comparing the first projection distance value and the second projection distance value, determining a focusing direction according to the comparison result, and converting the target motor position into a target motor position range according to a preset motor position error; and
    driving the motor to move according to the focusing direction and the target motor position range, calculating a definition value of a current projection picture each step that the motor is driven to move, and completing focusing when the motor is driven to move to a motor position with a highest definition value of a projection picture.

2. The projection focusing method as claimed in claim 1, wherein obtaining a comparison result by comparing the first projection distance value and the second projection distance value, determining a focusing direction according to the comparison result comprises:
    obtaining the comparison result by judging whether the first projection distance value is greater than the second projection distance value;
    setting the focusing direction as a first direction when the comparison result indicates that the first projection distance value is greater than the second projection distance value, wherein, when the motor moving towards the first direction, the projection distance between the motor and a projection plane becoming shorter;
    setting the focusing direction as a second direction when the comparison result indicates that the first projection distance value is not greater than the second projection distance value, wherein, when the motor moving towards the second direction, the projection distance between the motor and the projection plane becoming longer.

3. The projection focusing method as claimed in claim 1, wherein the method for converting the target motor position into the target motor position range according to the preset motor position error comprises:
    obtaining a difference value by calculating difference between the target motor position and the motor position error, and determining the difference value as the starting point of the target motor position range;
    obtaining a sum value by calculating summing between the target motor position and the motor position error, and determining the sum value as the end point of the target motor position range according to the preset motor position error.

4. The projection focusing method as claimed in claim 1, driving the motor to move according to the focusing direction and the target motor position range, calculating a definition value of a current projection picture each step that the motor is driven to move, and completing focusing when the motor is driven to move to the motor position with the highest definition value of the projection picture comprises:
    driving the motor to reach the starting point of the target motor position range according to the focusing direction; and
    driving the motor to move to the end point of the target motor position range, acquiring a current projection picture image each step that the motor is driven to move, calculating a definition value of the current projection picture image, comparing the definition value of the current projection picture image with a definition value of a previous projection picture image, and when the definition value of the current projection picture image is less than the definition value of the previous projection picture image, driving the motor to return to the previous step to complete focusing.

5. A projection focusing apparatus, comprising:
    a projection distance acquiring component which is configured to establish a mapping relation between a projection distance and a motor position, acquire a motor position at current time, and acquire a first projection distance value corresponding to the motor position at current time according to the mapping relation;
    a target position acquiring component which is configured to acquire a current projection distance, determine the current projection distance as a second projection distance value, and acquire a target motor position corresponding to the second projection distance value according to the mapping relation;
    a focusing range acquiring component which is configured to obtain a comparison result by comparing the first projection distance value and the second projection distance value, determine a focusing direction according to the comparison result, and convert the target motor position into a target motor position range according to a preset motor position error; and
    a driving focusing calculating component which is configured to drive the motor to move according to the focusing direction and the target motor position range, calculate definition value of a current projection picture each step that the motor is driven to move, and complete focusing when the motor is driven to move to a motor position with a highest definition value of a projection picture.

6. The projection focusing apparatus as claimed in claim 5, wherein the focusing range acquiring component comprises:
    a focusing direction judging unit which is configured to obtain the comparison result by judging whether the first projection distance value is greater than the second projection distance value, entering a first setting unit when the comparison result indicates that the first projection distance value is greater than the second projection distance value, and entering a second setting unit when the comparison result indicates that the first projection distance value is not greater than the second projection distance value;

the first setting unit which is configured to set the focusing direction as a first direction, wherein, when the motor moving towards the first direction, the projection distance between the motor and a projection plane becoming shorter;

the second setting unit which is configured to set the focusing direction as a second direction, wherein, when the motor moving towards the second direction, the projection distance between the motor and the projection plane becoming longer.

7. The projection focusing apparatus as claimed in claim 5, wherein the focusing range acquiring component comprises:

a focusing range generating unit which is configured to obtain a difference value by calculating difference between the target motor position and the motor position error, and determine the difference value as a starting point of the target motor position range, and obtain a sum value by calculating summing between the target motor position and the motor position error, and determining the sum value as an end point of the target motor position range.

8. The projection focusing apparatus as claimed in claim 5, wherein the driving focusing calculating component comprises:

a motor driving unit which is configured to drive the motor to reach the starting point of the target motor position range according to the focusing direction; and a definition comparing unit which is configured to drive the motor to move to the end point of the target motor position range, acquire a current projection picture image each step that the motor is driven to move, calculate a definition value of the current projection picture image, compare the definition value of the current projection picture image with a definition value of a previous projection picture image, and when the definition value of the current projection picture image is less than the definition value of the previous projection picture image, drive the motor to return to the previous step to complete focusing.

9. A projector, comprising:
a memory which is configured to store a computer program; and
a processor which is configured to execute the computer program to implement the steps of the projection focusing method as claimed in claim 1.

10. A readable storage medium, wherein the readable storage medium stores a computer program which, when executed by a processor, implements the steps of the projection focusing method as claimed in claim 1.

11. A projector, comprising:
a memory which is configured to store a computer program; and
a processor which is configured to execute the computer program to implement the steps of the projection focusing method as claimed in claim 2.

12. A projector, comprising:
a memory which is configured to store a computer program; and
a processor which is configured to execute the computer program to implement the steps of the projection focusing method as claimed in claim 3.

13. A projector, comprising:
a memory which is configured to store a computer program; and
a processor which is configured to execute the computer program to implement the steps of the projection focusing method as claimed in claim 4.

14. A readable storage medium, wherein the readable storage medium stores a computer program which, when executed by a processor, implements the steps of the projection focusing method as claimed in claim 2.

15. A readable storage medium, wherein the readable storage medium stores a computer program which, when executed by a processor, implements the steps of the projection focusing method as claimed in claim 3.

16. A readable storage medium, wherein the readable storage medium stores a computer program which, when executed by a processor, implements the steps of the projection focusing method as claimed in claim 4.

* * * * *